US006219597B1

(12) United States Patent
Longere

(10) Patent No.: US 6,219,597 B1
(45) Date of Patent: Apr. 17, 2001

(54) PROCESS AND DEVICE FOR AIDING THE MAINTENANCE OF A COMPLEX SYSTEM, ESPECIALLY AN AIRCRAFT

(75) Inventor: Jean-Yves Longere, Gardanne (FR)

(73) Assignee: Eurocopter (FR)

( * ) Notice: Subject to any disclaimer, the term of this patent is extended or adjusted under 35 U.S.C. 154(b) by 0 days.

(21) Appl. No.: 09/407,957

(22) Filed: Sep. 28, 1999

(30) Foreign Application Priority Data

Oct. 21, 1998 (FR) .................................................. 98 13191

(51) Int. Cl.[7] .............................. B64D 43/00; B64F 5/00
(52) U.S. Cl. ................... 701/29; 701/29; 701/30; 701/45; 244/1 R; 364/424.03; 364/184
(58) Field of Search .................. 701/29, 30; 364/424.03; 244/1 R

(56) References Cited

U.S. PATENT DOCUMENTS

| 5,060,156 | 10/1991 | Vajgart et al. ................ 364/424.03 |
| 5,184,312 | * 2/1993 | Ellis ................................ 364/551.01 |
| 5,239,468 | * 8/1993 | Sewersky et al. ............ 364/424.03 |
| 5,445,347 | 8/1995 | Ng ..................................... 246/169 R |
| 5,638,383 | * 6/1997 | Wotzak et al. ..................... 371/22.5 |
| 5,754,965 | 5/1998 | Hagenbuch .......................... 701/35 |
| 6,003,808 | * 12/1999 | Nguyen et al. ..................... 244/1 R |

FOREIGN PATENT DOCUMENTS

| 0407179 | 1/1991 | (EP) . |
| 0 407 179 A1 | * 1/1991 | (GB) . |

* cited by examiner

Primary Examiner—William A. Cuchlinski, Jr.
Assistant Examiner—Tuan To
(74) Attorney, Agent, or Firm—Stevens, Davis, Miller & Mosher, LLP

(57) ABSTRACT

The present invention relates to a device and a process for aiding the maintenance of a complex system, especially an aircraft.

According to the invention, said device comprises units for determining and recording, iteratively, during the operation of the complex system, monitoring data representative of the actual operation of at least one element of the complex system, a unit for determining, on the basis of the recorded monitoring data and with the aid of degradation models, at least one damage level of said element, and a unit for determining, on the basis of this damage level, at least maintenance deadlines for said element, and a unit for signaling these maintenance deadlines to an operator of said complex system.

16 Claims, 1 Drawing Sheet

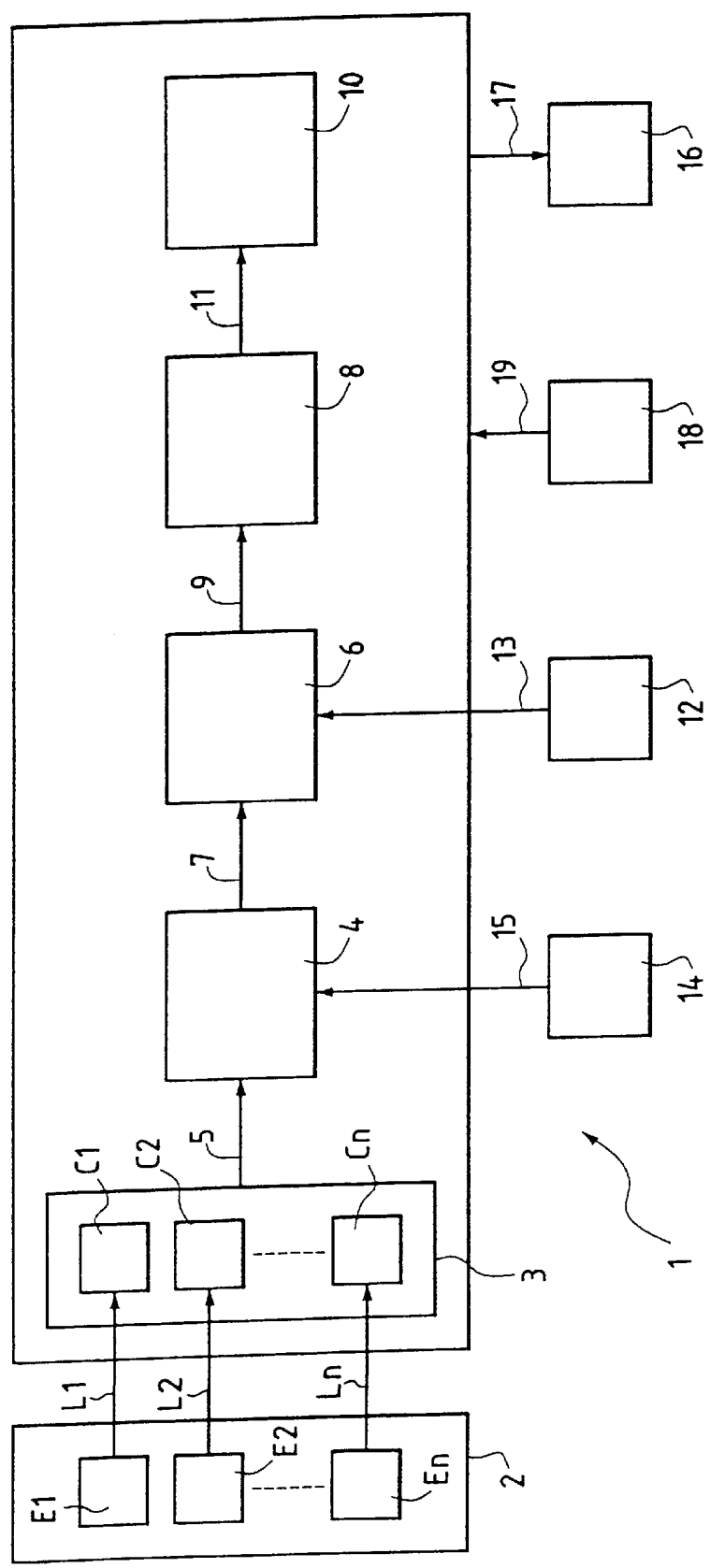

PROCESS AND DEVICE FOR AIDING THE MAINTENANCE OF A COMPLEX SYSTEM, ESPECIALLY AN AIRCRAFT

BACKGROUND OF THE INVENTION

1. Field of the Invention

The present invention relates to a process for aiding the maintenance of a complex system, as well as a device for implementing this process.

2. Description of the Related Art

Within the context of the present invention, the expression complex system is understood to mean a system comprising a plurality of components, especially electronic, mechanical and hydraulic components, exhibiting numerous interconnections. Complex systems of this type exist in a great variety of fields of activity, such as for example in industry, in the automobile sector or in aviation.

For the maintenance of a complex system of this kind, in particular an aircraft such as a helicopter, in the simplest cases a maintenance plan is formed which catalogs the potential failures of said complex system and describes the refurbishment procedures suitable for the situation encountered. This known approach has a major drawback due to the unforeseen and unforeseeable nature of the moment of the failure so that it is often completely inadvisable, or even impossible, to implement it, for safety reasons.

By way of illustration, with regard, for example, to the lubricating of the engine of a vehicle, this known approach presupposes that the oil is neither changed nor checked, but that the consequences of the loss of lubrication are awaited in order to carry out a maintenance action, which is of course absurd.

To remedy this drawback, another known maintenance procedure advocates the use of a concept of preventive maintenance, which in its simplest version consists in periodically exchanging or overhauling parts or elements of the complex system. In the aforesaid exemplary illustration, this approach consists in carrying out drainage at regular time intervals, for example every three months (a period which is presumed to be sufficient in order for the oil for example of an optimally running automobile to be degraded). The drawback of this maintenance procedure relates to the operational constraints (availability, cost) related thereto, since the maintenance is performed prior to failure, usually on parts which are still serviceable.

It will be noted that another known procedure advocates that the state of the parts be monitored directly, this entailing drawbacks due to the quality of the observation criteria, to their representativity, to the constraint imposed on the user of the complex system and to the risks of errors.

In practice, the constructor of the complex system or the maintenance operator seeks, among the various possible maintenance options, the best compromise between the risk of an unforeseen failure, and one which is therefore penalizing in respect of safety or availability, and prior maintenance, which is therefore expensive and constraining.

However, this compromise generally entails a maintenance deadline which is very much ahead of the optimal deadline and, usually, the changed parts are still in a satisfactory state of serviceability when they are replaced.

Accordingly, for parts such as the settings for the blades of a helicopter, for example, for which any maintenance error is proscribed for obvious safety reasons, the margins regarding the timescales for changing parts are considerable and/or the maintenance regarding the monitoring of the state of the parts is very unwieldy.

SUMMARY OF THE INVENTION

The object of the present invention is to remedy these drawbacks according to the present invention a process for aiding the maintenance of a complex system which makes it possible to carry out maintenance actions at reduced cost and reduced monitoring, whilst preserving safety.

To this end, according to the invention, a process for aiding the maintenance of a complex system, especially an aircraft, is noteworthy in that the following actions are carried out iteratively and automatically:

a) during the operation of said complex system, monitoring data representative of the actual operation of at least one element of said complex system are determined and recorded iteratively;

b) at least one damage level representative of the actual damage to said element is determined from said recorded monitoring data and with the aid of degradation models;

c) on the basis of this damage level at least maintenance deadlines are updated for said element; and d) these maintenance deadlines are signaled to an operator of said complex system.

Thus, by virtue of the invention, the maintenance deadlines or the maintenance plan are automatically adapted to the actual state (of damage) of the complex system and/or of its elements, during the operation of said complex system, thus making it possible to define maintenance actions which are optimal in particular as regards availability, cost and safety.

To this end, it will be noted that:

the process in accordance with the invention makes it possible to refine the diagnosis relating to the damage to the parts or elements of the complex system and hence to limit the margins with regard to the dismantling or repair criteria, so as to ensure the safety and availability of the complex system. This reduction in the margins makes it possible to defer the maintenance works and hence to limit, over a given period, the cost of maintenance; and the knowledge of the actual damage to the complex system makes it possible to anticipate the failures and thereby permits preventive maintenance which limits the cases of unprogrammed dismantling, which are the most penalizing with regard to the operational availability of the system.

Moreover, the early and reliable prediction of failures, which is thus achieved, allows economic planning of maintenance.

Advantageously, in step a) at least some of the following information is determined and recorded as monitoring data:

information characterizing levels of use of said complex system;

information characterizing levels of loading;

health information;

information relating to the behavior of said element or of said complex system; and information relating to alarms or instructions generated by said complex system.

Furthermore, advantageously:

in step b), at least one of the following models is used as degradation models:

a model for determining limits of operation of said element of the complex system; and a behavioral model of said element; and/or in step c), the maintenance deadlines are determined from:
the damage level determined in step b);
a damage threshold for said element; and
a damage rate for said element; and/or in step c), a projected timetable of maintenance actions to be carried out on said complex system is generated; and/or in step c), auxiliary maintenance information is also determined, and in step d), this auxiliary maintenance information, in particular damage curves and tie-ups with maintenance manuals, is signaled to said operator.

Additionally, in order to optimize the maintenance actions, advantageously, in step a), said monitoring data are determined arbitrarily in such a way as to be able to carry out simulations.

Moreover, advantageously, at least the conditions of use of said complex system and data occurring during the implementation of the process are recorded, thus making it possible to exploit the experience acquired by implementing said process. The information thus recorded benefits in particular the user of said complex system in order to provide him with a better knowledge of said complex system and/or of the elements thereof, as well as the impact of the operational conditions on this complex system or these elements.

Furthermore, to improve the accuracy of the processings, advantageously, complementary information is used to refine:
in step b), said damage level; and
in step c), the information determined on the basis of said damage level.

Moreover, according to the invention, at least data occurring during the implementation of steps a) and b) of said process are recorded in such a way as to be able to retrieve them, thus making it possible to obtain an accurate picture regarding the actual state of the complex system.

Furthermore, in particular so that a maintenance operator can best plan the provisioning of the means necessary for the maintenance, maintenance actions which are required to be carried out are prepared as a function of said maintenance deadlines.

Additionally, advantageously, at least some of the data occurring during the implementation of the process are exploited statistically, in such a way as to identify the most damaging conditions of use of said complex system, regarding in particular reliability, cost of maintenance and availability, thus allowing a user of said complex system to operate the latter under the most advantageous conditions.

The present invention also relates to a device for implementing the aforesaid process.

According to the invention, said device is noteworthy in that it comprises:
means for determining monitoring data;
means for recording said monitoring data;
means for determining damage levels;
means for determining maintenance deadlines;
means for signaling said maintenance deadlines; and optionally
means for modifying a damage threshold;
means for arbitrarily determining the monitoring data;
means for recording data; and
means for updating the information, in particular in software form, used by at least some of said means of said device.

BRIEF DESCRIPTION OF THE DRAWING

The single FIGURE of the appended drawing will elucidate the manner in which the invention may be embodied. It represents a schematic diagram of a device in accordance with the invention.

DETAILED DESCRIPTION OF THE PREFERRED EMBODIMENTS

The device 1 in accordance with the invention and represented diagrammatically in the FIGURE is a device for aiding the maintenance of a complex system 2.

Within the context of the present invention, said complex system 2, for example a rotary-wing aircraft, comprises a plurality of elements E1 to En, for example electronic, mechanical or hydraulic elements, some of which are linked together.

According to the invention, said device 1 comprises, as specified below:
means 3 intended for iteratively determining monitoring data representative of the actual operation of said elements E1 to En;
means 4 linked by a link 5 to said means 3 and intended for recording said monitoring data;
means 6 linked by a link 7 to said means 4 and intended for determining damage levels of said elements E1 to En, on the basis of said monitoring data and with the aid of built-in degradation models specified below;
means 8 linked by a link 9 to said means 6 and intended for updating at least maintenance deadlines relating to said elements E1 to En, on the basis of said damage levels; and
means 10 linked by a link 11 to said means 8 and intended for signaling to an operator of said complex system 2, in particular a maintenance operator or a user, the results of the processings carried out by said device 1 and in particular a maintenance plan or said maintenance deadlines.

Thus, by virtue of the invention, said device 1 automatically adapts the information (maintenance plan, maintenance deadlines) signaled to the operator to the actual state of damage of the complex system and/or of the elements E1 to En, thus making it possible to define maintenance actions which are optimal in particular as regards availability, cost and safety.

According to the invention, said means 3 comprise a plurality of information sources C1 to Cn, for example sensors, computers or test means, respectively monitoring said elements E1 to En, as illustrated by links L1 to Ln, and determining monitoring data.

Although represented separately in the figure, especially for reasons of simplification of the drawing, these information sources C1 to Cn, like the other means of said device 1, may within the context of the present invention represent existing elements in said system 2.

According to the invention, the monitoring data determined by the means 3 comprise at least some of the following information:
information characterizing levels of use of the complex system 2, such as the period of use during operation, the period of storage, the number of cycles performed or the calendar period since commissioning;
information characterizing levels of loading, such as the external operating conditions (temperature, humidity, magnetic field, etc.) and/or the constraints of use (load, stowed weight, speed, etc.);
health information, such as vibration signatures, the pollution of fluids or built-in tests;
information relating to the behavior of said elements E1 to En or of said complex system 2; and alarms and instructions generated by said complex system 2.

At least some of said monitoring data are recorded, in particular during the operation of the system 2, by said means 4 which comprise, for example, memories which exist in said system 2 or specific memories. Depending on the nature of the data, recording can be continuous or on an event basis (incident, alarm, etc.). In the latter case, it can be date-stamped and accompanied by the current configuration of the system 2 at the moment of the event taken into account.

Moreover, to take account of the limitation of the memory storage resources available, data compression techniques can be used to reduce the volume of the recording. It is also possible to select data as a function of their benefit in respect of diagnosis.

Moreover, it will be noted that the degradation models used by the means 6, to determine the damage levels, can be of different forms depending on the type of hardware, the knowledge of its behavior in terms of reliability and the maintenance choices adopted. Moreover, they can be global to said system 2, itemized on a parts or elements E1 to En basis, on a type of damage basis or individual damage basis. Of course, these degradation models use the monitoring data as inputs.

According to the invention, a first degradation model can be a model for determining limits of operation of said elements E1 to En in such a manner as to tailor said limits of operation to the actual constraints of use.

It is known that, in order to curb risks of failure having an influence on safety or strongly penalizing maintenance, operating limits (lifetime, overhauling, etc.) are imposed on certain items of equipment or on certain of said elements E1 to En. The value of these operating limits generally depends on the conditions of use. These conditions of use are characterized by a number of parameters but, in view of the impossibility of obliging in particular a user of said system 2 to track all the dimensioning parameters, usually, only those of prime importance (number of operating hours for example) are tracked by the user, the others are fixed a priori, for example by the constructor of the system 2, on the basis of a standard prediction of use, thus compelling the building in of sizeable margins to cover the spread of use.

This drawback is remedied by using the aforesaid degradation model.

Specifically, the automatic monitoring implemented by the present invention makes it possible to track a large number of parameters and hence, for a given risk of failures, to extend the operating limit. The invention then consists, for a given operating limit, in measuring in real time by way of the means 3 the values of the monitoring data which dimension this limit, and then in tailoring this limit on the basis of these values by way of the means 6.

Furthermore, it is known that the operating limits presuppose that after a certain aggregation of constraints, the item of equipment or the element E1 to En considered is at risk of exhibiting malfunctions. Also, a more direct means of curbing this risk of failure is to monitor the state of said element directly, rather than the constraints, so as to detect the precursor signs of degradation.

The damage is thus measured directly instead of being deduced from an aggregate constraint level. The lifetime can then be replaced by an information item regarding the damage to the part. This type of approach applies, in particular, to elements E1 to En or to parts or equipment exhibiting progressive degradation.

These last two examples relate to cases of use within normal limits of use of the system 2. The same reasoning applies in respect of cases where parameters overstep the permitted limits, for example in the case of lightning. In such cases, provision is made for maintenance actions associated with these occurrences of overstepping which consist in dismantling, checking and/or exchanging a number of elements. Objective measurement of these overstepping occurrences makes it possible to limit the margins of the dismantling or repair criteria.

Furthermore, according to the invention, another degradation model may be a behavioral model of said elements E1 to En, so as to obtain as the case may be an aid to the locating of a failed element, by comparing the results obtained from this behavioral model with recorded reference values.

The processings carried out by the means 6, for example a personal computer, can be performed either in real time during the operating time of the system 2, or in delayed time, for example at the end of a mission.

Moreover, the means 8 update programmed deadlines and also unprogrammed deadlines.

To do this, said means 8 use:

the damage levels determined by the means 6, for said elements E1 to En;

damage thresholds for said elements E1 to En. These thresholds can be of a safety nature (risks of faults liable to affect the safety of persons or the environment) or of an economic nature (failure risks liable to entail the immobilization of the system 2); and presumed damage rates for said elements E1 to En which are determined, for example, by a constructor or a user of said system 2 or of said elements E1 to En.

As far as the means 10 are concerned, they signal, for example by means of a display screen or a printed support, to a maintenance operator or to anybody using the device 1 in accordance with the invention, said maintenance deadlines, in particular in a simplified manner in the form of a projected timetable which presents the various maintenance deadlines in chronological order.

As a variant and/or as a supplement, said means 10 may also group together various maintenance actions in such a way as to indicate several dates in respect of maintenance interventions, as well as the actions to be performed on these dates.

Furthermore, in another variant, the means 8 determine auxiliary maintenance information which is subsequently presented to an operator by the means 10, and in particular:

damage curves for said elements E1 to En;

organizational guidelines for optimizing the dates of the maintenance interventions, in particular if they differ from those initially scheduled; and cross-references to one or more maintenance manuals which contain guidelines or indications for carrying out said maintenance actions.

The device 1 in accordance with the invention, such as described earlier, may comprise other means specified below, which may in particular represent optional means.

In particular, said device 1 may comprise, as represented in the figure, means 12 making it possible to modify the damage thresholds used by the means 6, as is illustrated by a link 13.

In a first embodiment, said means 12 which comprise for example a keyboard, allow an operator to input the chosen threshold values directly, a maximum value possibly being imposed so as to guarantee a requisite safety level.

It will be noted that an increase in the thresholds defers the maintenance deadline and generally reduces the cost of use, but on the other hand results in an increase in the risk of unprogrammed failures and therefore penalizes availability.

In a second embodiment, said means 12 make it possible to input maintenance performance ratings and the means 6 comprise models making it possible to deduce optimal damage thresholds from maintenance performance ratings thus input.

It is, for example, possible to choose maintenance performance ratings which afford a maximum level of availability during a given period (to the detriment of cost) or an overall cost of use (defined as the sum of the costs of unavailability and of the maintenance costs).

Said means 12 may also be used to input, manually or in an automated manner, complementary information allowing the means 6 to refine the diagnoses or their interpretation.

This complementary information relates in particular to data which are difficult to obtain automatically, such as for example problems with corrosion, with incipient flaws in elastomers or a guideline regarding the proper operation of a bulb. It may also consist of complementary tests, for example to alleviate difficulties of diagnosis.

Moreover, the device 1 comprises means 14 making it possible arbitrarily to input monitoring data into said means 4, as is illustrated by a link 15. The data thus input are intended to replace in the process implemented by the device 1 the data measured by the means 3 and may, in particular, represent data characteristic of conditions of usage which one wishes to simulate.

Thus, it is possible to simulate different conditions of usage or of use and to determine the consequences thereof on the maintenance deadlines.

As a variant, it is also possible to simulate, in particular by way of the means 12, the influence on the projected maintenance plan, of a modification of the level of the damage thresholds.

Moreover, the device 1 comprises means 16 making it possible to record, as is illustrated in a general manner by a single link 17, data formed by the processings of the various means of the device 1 or occurring during these processings.

This may in particular involve measurements of the monitoring means 3, results of diagnoses (in particular the changes in damage) of the means 6, observation of failures, faults or damage in the elements of the complex system 2, the log of maintenance works, damage curves or the relationship between the damage level determined by the device 1 and a maintenance appraisal report.

However, in a preferred mode of implementation of the invention, said means 16 record in addition to the aforesaid data, information relating to the conditions of current use of the system 2.

This makes it possible to determine the impact of these conditions of use on the elements E1 to En of the system 2 and hence to deduce optimal use therefrom, especially in respect of damage to the elements E1 to En.

According to the invention, it is for example possible to deduce the various types of following information from the aforesaid data:

analysis of the conditions of use of the system 2 (level of the loadings, environmental constraints, etc.) for better definition of the standard dimensioning spectra;

consolidation of the prediction and diagnosis models, in particular by matching (for example with data analysis tools) the tie-ups between the failure or the state of degradation observed in the elements and the information delivered by the monitoring means 3; and extraction of the most important factors with respect to the degradation of the system 2, so as to improve maintenance.

In another embodiment, said means 16 record at least the data occurring during processings carried out by the means 3 and 4, thus making it possible to obtain an accurate picture of the actual state of damage of the system 2.

The information thus obtained may in particular be used by the constructor of the system 2 to establish or refine a diagnosis which can be transmitted to a user of said system 2.

The device 1 may furthermore comprise optional means 18 which make it possible to reupdate the various items of software used by the device 1, as is illustrated by a link 19.

Moreover, the means 10 may provide, in a particular embodiment, in addition to the maintenance deadlines, indications regarding the means required to carry out the maintenance actions, thus making it possible to plan the provisioning of these means and hence to prepare in advance the maintenance interventions to be performed.

Moreover, the device 1 can statistically exploit at least some of the data occurring during the implementation of the process in accordance with the invention in such a way as to identify the most damaging conditions of usage and to inform the user of the system 2 thereof, for example in the form of cautions.

These cautions can be of various types, and in particular:

cautions with regard to (exceptional or repeated) oversteppings of a damage threshold; and cautions with regard to loadings which overstep by a certain percentage the average levels recorded by the user of the system 2.

Of course, within the context of the present invention, the interfaces between the device 1 and the various users can be adapted to the type of use envisaged, in particular by making or not making provision for certain of said optional means 12, 14, 16 and 18.

What is claimed is:

1. A process for automatically aiding the maintenance of a complex system, said process comprising:
   (a) determining and recording monitoring data representative of an actual operation of at least one element of said complex system during operation;
   (b) determining at least one damage level representative of actual damage to said at least one element from said monitoring data recorded in step (a), with the aid of degradation models;
   (c) updating maintenance deadlines for at least said at least one element based on:
      (i) the at least one damage level recorded in step (b);
      (ii) a damage threshold for said at least one element; and
      (iii) a damage rate for said at least one element; and
   (d) signaling an operator with the updated maintenance deadline determined in step (c) for said at least one element.

2. The process as claimed in claim 1, wherein damage threshold which is modifiable is used.

3. The process as claimed in claim 1, wherein step c) includes automatically generating a projected timetable of maintenance actions to be carried out on said complex system.

4. The process as claimed in claim 1, wherein:
   step c) includes automatically determining auxiliary maintenance information; and
   step d) includes automatically signaling said auxiliary maintenance information to said operator.

5. The process as claimed in claim 1, wherein step a) includes determining said monitoring data arbitrarily so as to carry out simulations.

6. The process as claimed in claim 1, further comprising automatically recording at least conditions of use of said complex system and monitoring data occurring during said process.

7. The process as claimed in claim 1, wherein complementary information is used to automatically refine:
   in step b), said damage level; and
   in step c), the information determined on the basis of said damage level.

8. The process as claimed in claim 1, wherein at least data occurring during the implementation of steps a) and b) of said process are recorded automatically and are retrievable.

9. The process a claimed in claim 1, wherein maintenance actions which are required to be carried out are prepared automatically as a function of said maintenance deadlines.

10. The process as claimed in claim 1, wherein at least some of the data occurring during the implementation of the process are exploited statistically, automatically, for identifying the most damaging conditions of use of said complex system.

11. A device for implementing the process specified under claim 1, comprising:
   means for determining monitoring data;
   means for recording said monitoring data;
   means for determining damage levels on the basis of these monitoring data;
   means for determining maintenance deadlines on the basis of these damage levels; and
   means for signaling said maintenance deadlines.

12. The device as claimed in claim 11, further comprising at least one of:
   means for modifying a damage threshold;
   means for arbitrarily determining the monitoring data;
   means for recording data; and
   means for updating the information used by at least one of said means for modifying, said means for arbitrarily determining, said means for recording, and said means for updating of said device.

13. The process according to claim 1, wherein the monitoring data determined and recorded in step (a) includes at least one of:
   (i) information regarding usage levels of said complex system;
   (ii) information regarding load levels from at least one of:
      usage constraints of at least one of a type of load, a stowed weight, and speed; and
      external operating conditions of at least one of temperature, humidity, and magnetic fields;
   (iii) information regarding health of said complex system including at least one of:
      pollution of fluids, built-in tests, and vibration signatures;
   (iv) information regarding a behavioral model comprising reference values of at least one of said at least one element and said complex system; and
   (v) information regarding at least one of alarms and instructions generated by said complex system.

14. The process as claimed in claim 1, wherein the degradation models recited in step (b) comprise at least one of:
   (i) a model for determining limits of operation of said at least one element of said complex system determined by usage constraints including at least one of a lifetime usage limit of said at least one element and an overhauling limit of said at least one element; and
   (ii) a behavioral model providing an aid for determining a failed element, said failed element being determined by comparing said monitoring data with recorded reference values.

15. The process according to claim 14, wherein the usage constraints are determined by an amount of operating hours.

16. The process according to claim 1, wherein the recording and monitoring recited in step (a) is continuous during operation of said complex system.

* * * * *